US008686693B2

(12) United States Patent
Bhowmik et al.

(10) Patent No.: US 8,686,693 B2
(45) Date of Patent: Apr. 1, 2014

(54) SYSTEMS AND METHODS FOR SCALABLE CONFIGURATIONS OF INTELLIGENT ENERGY STORAGE PACKS

(75) Inventors: Shibashis Bhowmik, Fremont, CA (US); Eric Macris, San Francisco, CA (US)

(73) Assignee: Volterra Semiconductor Corporation, San Jose, CA (US)

(*) Notice: Subject to any disclaimer, the term of this patent is extended or adjusted under 35 U.S.C. 154(b) by 493 days.

(21) Appl. No.: 12/716,203

(22) Filed: Mar. 2, 2010

(65) Prior Publication Data

US 2010/0305770 A1 Dec. 2, 2010

Related U.S. Application Data

(60) Provisional application No. 61/202,460, filed on Mar. 2, 2009.

(51) Int. Cl.
*H02J 7/04* (2006.01)
*H02J 7/16* (2006.01)

(52) U.S. Cl.
USPC ............................ 320/152; 320/134; 320/136

(58) Field of Classification Search
USPC .......................................... 320/152, 134, 136
See application file for complete search history.

(56) References Cited

U.S. PATENT DOCUMENTS

| 4,263,644 | A | 4/1981 | Zellmer |
| 4,307,441 | A | 12/1981 | Bello |
| 4,369,489 | A | 1/1983 | Pruitt |
| 4,504,896 | A | 3/1985 | Aires et al. |
| 4,504,898 | A | 3/1985 | Pilukaitis et al. |
| 4,577,268 | A | 3/1986 | Aires et al. |
| 4,654,769 | A | 3/1987 | Middlebrook |
| 4,709,316 | A | 11/1987 | Ngo et al. |
| 4,916,379 | A | 4/1990 | Gaubis et al. |
| 5,068,575 | A | 11/1991 | Dunsmore et al. |
| 5,101,335 | A | 3/1992 | Dunsmore et al. |
| 5,204,809 | A | 4/1993 | Andresen |
| 5,521,807 | A | 5/1996 | Chen et al. |
| 5,663,874 | A | 9/1997 | Mader et al. |
| 5,694,030 | A | 12/1997 | Hasegawa et al. |
| 5,701,068 | A * | 12/1997 | Baer et al. ..................... 320/119 |
| 5,710,504 | A | 1/1998 | Pascual et al. |

(Continued)

FOREIGN PATENT DOCUMENTS

JP 11103538 4/1999

OTHER PUBLICATIONS

WO, PCT/US2010/025978—Search Report, Mar. 2, 2010.

(Continued)

*Primary Examiner* — Samuel Berhanu
(74) *Attorney, Agent, or Firm* — King & Spalding LLP

(57) ABSTRACT

A system and method for scalable configuration of intelligent energy storage packs are disclosed. According to one embodiment, a method comprises providing a first current measurement of a first energy storage cell electrically connected to a first converter circuit, and the first converter circuit controls the charge and discharge of the first energy storage cell. A first voltage measurement of the first energy storage cell is provided. First control signals are received and the first control signals are determined according to a load policy. The first converter circuit transforms a first voltage from the first energy storage cell to a desired first bus contribution voltage according to the first control signals.

23 Claims, 10 Drawing Sheets

(56) References Cited

U.S. PATENT DOCUMENTS

| | | | |
|---|---|---|---|
| 5,745,352 A | 4/1998 | Borghi et al. | |
| 5,781,419 A | 7/1998 | Divan et al. | |
| 5,808,455 A | 9/1998 | Ren et al. | |
| 5,917,313 A | 6/1999 | Callahan, Jr. | |
| 5,939,866 A | 8/1999 | Bjorkengren | |
| 5,945,808 A * | 8/1999 | Kikuchi et al. | 320/132 |
| 5,991,171 A | 11/1999 | Cheng | |
| 5,998,967 A | 12/1999 | Umeki et al. | |
| 6,043,629 A | 3/2000 | Ashley et al. | |
| 6,058,030 A | 5/2000 | Hawkes et al. | |
| 6,121,751 A | 9/2000 | Merritt | |
| 6,137,274 A | 10/2000 | Rajagopalan | |
| 6,140,808 A | 10/2000 | Massie | |
| 6,141,224 A | 10/2000 | Ma et al. | |
| 6,150,795 A | 11/2000 | Kutkut et al. | |
| 6,225,794 B1 | 5/2001 | Criscione et al. | |
| 6,278,621 B1 | 8/2001 | Xia et al. | |
| 6,285,175 B1 | 9/2001 | Massie | |
| 6,369,546 B1 | 4/2002 | Canter | |
| 6,417,653 B1 | 7/2002 | Massie et al. | |
| 6,420,858 B1 | 7/2002 | Kitagawa et al. | |
| 6,424,119 B1 | 7/2002 | Nelson et al. | |
| 6,437,539 B2 | 8/2002 | Olsson et al. | |
| 6,462,962 B1 | 10/2002 | Cuk | |
| 6,465,986 B1 | 10/2002 | Haba | |
| 6,510,065 B1 | 1/2003 | Massie et al. | |
| 6,583,603 B1 | 6/2003 | Baldwin | |
| 6,628,533 B2 | 9/2003 | Dinh | |
| 6,696,825 B2 | 2/2004 | Harris et al. | |
| 6,704,211 B1 | 3/2004 | Vogman | |
| 6,771,045 B1 | 8/2004 | Keller | |
| 6,801,014 B1 | 10/2004 | Chitsazan et al. | |
| 6,842,350 B2 | 1/2005 | Simada et al. | |
| 6,873,134 B2 | 3/2005 | Canter et al. | |
| 6,903,537 B2 | 6/2005 | Chen et al. | |
| 7,002,817 B2 | 2/2006 | Lipcsei | |
| 7,046,530 B2 | 5/2006 | May | |
| 7,049,791 B2 | 5/2006 | Lin et al. | |
| 7,135,836 B2 | 11/2006 | Kutkut et al. | |
| 7,135,837 B2 | 11/2006 | Patino | |
| 7,193,392 B2 * | 3/2007 | King et al. | 320/118 |
| 7,196,494 B2 | 3/2007 | Baumgartner | |
| 7,233,133 B2 | 6/2007 | Chen et al. | |
| 7,233,134 B2 | 6/2007 | Huang et al. | |
| 7,375,503 B2 | 5/2008 | Bo | |
| 7,459,882 B2 | 12/2008 | Morgan | |
| 7,459,894 B2 | 12/2008 | Ge et al. | |
| 7,471,065 B2 | 12/2008 | Emori et al. | |
| 7,492,124 B2 | 2/2009 | Johnson et al. | |
| 2007/0103121 A1 * | 5/2007 | Johnson et al. | 320/134 |
| 2007/0247115 A1 * | 10/2007 | Ishikawa et al. | 320/119 |
| 2008/0231115 A1 | 9/2008 | Cho et al. | |
| 2009/0168463 A1 | 7/2009 | Zhao et al. | |
| 2009/0208821 A1 * | 8/2009 | Kosugi et al. | 429/61 |
| 2009/0295348 A1 | 12/2009 | Tao et al. | |
| 2009/0295349 A1 | 12/2009 | Tao et al. | |
| 2009/0295350 A1 | 12/2009 | Yamada | |
| 2009/0295351 A1 | 12/2009 | Kudo et al. | |
| 2010/0225277 A1 | 9/2010 | Ochi et al. | |

OTHER PUBLICATIONS

Lee, et al, "Intelligent Control Battery Equalization for Series Connected Lithium-Ion Battery Strings", IEEE Transactions on Industrial Electronics, vol. 52, No. 5, pp. 1297-1307 (2005).

Walker, et al, "Cascaded DC-DC Converter Connection of Photovoltaic Modules", IEEE Transactions on Power Electronics, vol. 19, No. 4, pp. 1130-1139 (2004).

Wolfs, et al, "Distributed Maximum Power Tracking for High Performance Vehicle Solar Arrays", Australasian Universities Power Engineering Conference (2004).

* cited by examiner

SYSTEMS AND METHODS FOR SCALABLE CONFIGURATIONS OF INTELLIGENT ENERGY STORAGE PACKS

The present application claims the benefit of and priority to U.S. Provisional Patent Application No. 61/202,460 entitled "SYSTEMS AND METHODS FOR SCALABLE CONFIGURATIONS OF INTELLIGENT ENERGY STORAGE PACKS" filed on Mar. 2, 2009, and is hereby incorporated by reference.

FIELD

The field of the invention relates generally to energy storage based power systems. In particular, the present invention is direct to systems and methods for scalable configurations of intelligent energy storage packs.

BACKGROUND

Battery packs, or arrangements of multiple energy storage cells coupled together, are used as power sources in a host of devices. The devices can include all-electric vehicles, hybrid electric vehicles, portable electronic devices, military applications, medical devices, and back-up power and distributed energy storage systems in residential and business locations. Improvements in underlying electrochemistry have yielded batteries with improved performance characteristics, for example the Li-ion battery. However, even where multiple energy storage cells are intended to be the same in structure and performance characteristics, there are differences among individual cells. Even with state-of-the-art manufacturing, cells are inherently dissimilar and demonstrate variations in capacity, lifetime, rates of charge/discharge, and other interrelated properties. For example, a battery pack containing a collection of individual cells may exhibit cell-to-cell differences in charge storage capacity of 2-3% when new, and this variation may increase over time (e.g., as the battery pack ages and is charged and discharged multiple times). Since the individual cells of a conventional battery pack may be electrically connected in series to form a series string, the overall performance of the battery pack can be degraded by the performance of the weakest cell in the string. For example, with conventional pack architectures, in a series string of cells, the first cell to become discharged during use may limit the discharge of the other cells poorly.

Conventional approaches have attempted to address the aforementioned problems and improve the performance of battery packs by providing charge balancing, i.e., electronic circuitry intended to equalize cell voltages or states of charge. Such charge-balance systems include electrical switches and other electrical elements (resistors, capacitors, inductors) present at each cell, or grouping of cells, of the battery pack. In such systems, resistors may be intermittently connected in parallel with battery cells in a coordinated manner to equalize cell charging voltages by shunting excess charge. In other systems, capacitors or inductors are intermittently connected in parallel with cells, such that charge can be transferred from relatively-high-voltage cells to relatively-low-voltage cells. In this manner, performance variations among cells are partially managed, such that the cells of the battery pack converge toward a desired voltage or state of charge.

Conventional switched-resistor, switched-capacitor, and switched-inductor battery management system architectures provide only partial solutions to the problem of performance variation among cells in multi-cell packs. These battery management systems have only a limited ability to accommodate variations in cell capacity, lifetime, maximum rates of charge/discharge, and other properties of multi-cell packs. Moreover, conventional battery management systems, while compensating for usage performance, may actually reduce the useable lifetimes of cells in a battery pack. As a result, in conventional battery packs, useful lifetime is diminished, typically limited by the weakest cells in the pack.

SUMMARY

A system and method for scalable configuration of intelligent energy storage packs are disclosed. According to one embodiment, a method comprises providing a first current measurement of a first energy storage cell electrically connected to a first converter circuit, and the first converter circuit controls the charge and discharge of the first energy storage cell. A first voltage measurement of the first energy storage cell is provided. First control signals are received and the first control signals are determined according to a load policy. The first converter circuit transforms a first voltage from the first energy storage cell to a desired first bus contribution voltage according to the first control signals.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION

The accompanying drawings, which are included as part of the present specification, illustrate the presently preferred embodiment and together with the general description given above and the detailed description of the preferred embodiment given below serve to explain and teach the principles of the present invention.

DETAILED DESCRIPTION

Figure 1:
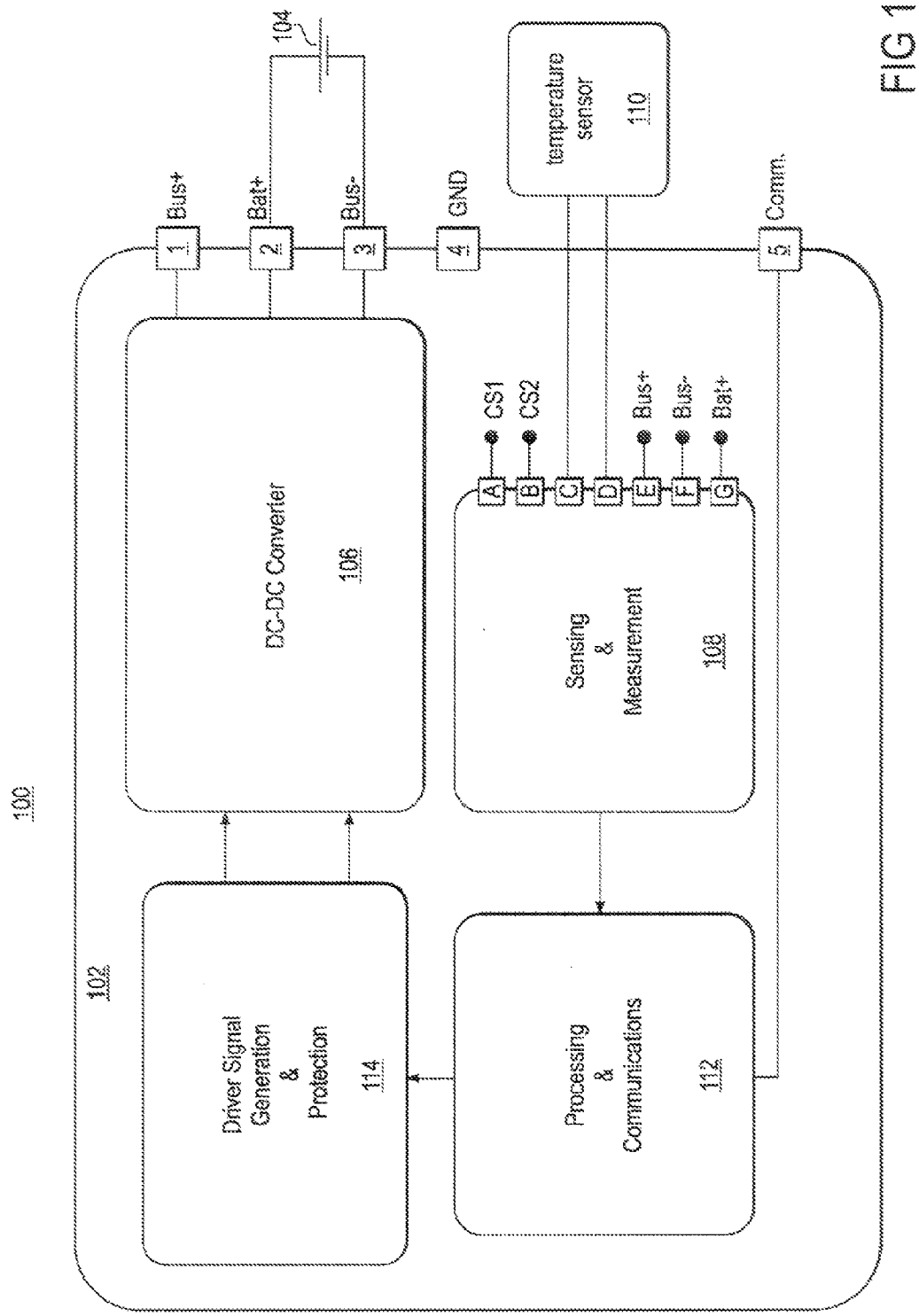
FIG. 1 illustrates an exemplary layout of a node, having a control circuit and energy storage cell, of a multi-cell energy storage pack, according to one embodiment.

A system and method for scalable configuration of intelligent energy storage packs are disclosed. According to one embodiment, a method comprises providing a first current measurement of a first energy storage cell electrically connected to a first converter circuit, and the first converter circuit controls the charge and discharge of the first energy storage cell. A first voltage measurement of the first energy storage cell is provided. First control signals are received and the first control signals are determined according to a load policy. The first converter circuit transforms a first voltage from the first energy storage cell to a desired first bus contribution voltage according to the first control signals.

The present system and method address performance variations associated with individual energy storage devices (referred to generally herein as "cells") in multi-cell energy storage packs. Exemplary energy storage devices as referred to herein include for example, electrochemical cells, super capacitors, magnetic energy storage devices, flywheels and associated electrical conversion circuitry, and other devices for the storage of electrical energy.

The present system and method accommodate cell-to-cell variability by electrically buffering each cell from the others in an energy storage pack. In other words, each cell of the energy storage pack can be fully and independently managed with respect to charge and discharge demand placed on each cell, while satisfying the power requirements of the load.

The present system and method is also applied to buffer groups of cells, rather than individual cells. In other words, multiple cells are grouped in combinations of series and/or parallel, with the group being managed fully and independently from other cells and/or cell groups.

Furthermore, the present system and method enable buffered cells to be placed in series strings without compromising individual cell performance. High-voltage, long series strings are desirable for most high-power applications, such as with automotive and grid-interactive solutions. Shorter series strings are desirable in many other, lower-power applications such as mobile electronics devices (e.g. laptop computers). In all such series strings, the present system and method enable power flow in and out of each cell to be optimized based on the cell's unique ability to deliver and accept charge.

The present system and method enable a combination of improved performance characteristics, including extension of pack lifetime, and reduced pack size using fewer cells to reach targeted performance levels, since each cell is used more optimally. The present system and method also have a high tolerance for variability among storage cells, thus enabling the use of less expensive cells manufactured to less stringent tolerances than the cells necessary in a conventional pack. Similarly, this high tolerance for variability enables the use of a higher percentage of cells manufactured (i.e. outlier performers can still be used instead of discarded). The present system and method also enable improved safety and reliability through cell-level monitoring, fault detection, and electrical isolation of faulty cells.

The present system and method also enable long series strings of buffered cells to provide a regulated, fixed output voltage—a desirable capability that contrasts with conventional energy storage packs, in which output voltage typically varies with the demands of the load and depends on the state of charge of the energy storage cells.

In one embodiment, the present system and method buffer each cell from the others by placing a bi-directional DC-DC converter between each cell and the others. The DC-DC converters themselves can be placed in long, series strings to reach high aggregate voltage outputs. The DC-DC converters enable the voltage and current at the cell to differ from the voltage and current at the output of the corresponding DC-DC converter. The difference in input versus output enables the aforementioned electrical buffering and optimization of power flow in and out of each cell.

According to the present system and method, DC-DC converters compensate electrically for any impedance differences among the connections to the electrically buffered cells. In conventional battery packs, performance is hindered by impedance differences among the electrical connections to the cells. This problem is compounded by the temperature sensitivity of electrochemical cells, and limits the use of welding or soldering to make reliable electrical connections of uniform impedance. In addition to their ability to compensate for these impedance differences, the DC-DC converters of the present system are robust compared to electrochemical cells and include electrical tabs that can be more easily welded or soldered.

According to the present system and method, high aggregate voltage outputs are achieved while incurring a minimum of system heat losses. DC-DC converters transform an input source voltage to a higher or lower output voltage. System energy losses and heat generation in the DC-DC converter circuit are typically proportional to the difference between input and output voltages, which is an inherent characteristic of all DC-DC converter designs. For example, a large step-up ratio between input and output voltages typically results in large energy losses. In the present system and method, such energy losses are minimized by minimizing the differences between input and output voltages. By placing the DC-DC converters in series strings, high aggregate output voltages are achieved while each DC-DC converter contributes a relatively low voltage to the string.

Moreover, in such a configuration, since each DC-DC converter operates at a relatively low voltage, the DC-DC converter circuit of the present system is built from relatively inexpensive components. For example, a low-voltage DC-DC converter is built with relatively inexpensive MOSFET switches, whereas a similar DC-DC converter operating at high voltages would be more optimally built with relatively expensive Insulated Gate Bipolar Transistor (IGBT) switches.

According to one embodiment, multiple control circuits, each being connected to its own energy storage cell, can be connected in a series string to provide a multi-cell storage pack as a high-voltage power source, each control circuit and corresponding energy storage cell being a "node" of the series string. According to one embodiment, multiple such series strings can be connected in parallel to provide a multi-cell storage pack with even larger power handling and energy capacity. The processing circuitry of each control circuit can communicate with a supervisory controller to provide a specified output voltage at each node in a multi-cell storage pack while enhancing the overall performance and lifetime of each energy storage cell individually.

The present system and method can be implemented either with a centralized supervisory controller or with the function of the supervisory controller implemented in a distributed processing system. According to one embodiment, such a distributed processing system is embedded as software in the control circuits of the nodes of a multi-node energy storage pack.

According to one embodiment, an energy storage control system includes a plurality of nodes electrically connected together for storing and providing electrical energy. The nodes may be connected in series and/or in parallel. A central processing system communicates with and controls the plurality of electrical nodes. Each node includes an electrical converter circuit for controlling a corresponding energy storage cell by transforming an input voltage from the cell to a desired output voltage or by transforming an input current from the cell to a desired output current. Each node also includes a sensing system for sensing electrical characteristics of an energy storage cell connectable to the electrical converter circuit, a processing system for controlling the electrical converter circuit of the corresponding energy storage cell using information from the sensing system, and a driving system for driving the electrical converter circuit using information from the processing system, according to one embodiment. The central processing system communicates with and instructs the processing system of each node so as to enhance overall system performance based on operating characteristics of the individual nodes.

The present system and method provide energy storage packs having high-voltage series strings that can facilitate more efficient DC/AC conversion in systems for propulsion drives (e.g., for electric or hybrid vehicles) or on-grid or off-grid stationary powering systems. For high-voltage applications, the conversion from DC to AC is more efficient at higher input DC voltages. For example, high-voltage energy storage packs according to exemplary embodiments described herein, an intermediate DC/DC up-converter, which is typically needed between a cell-pack and DC/AC converter, may be eliminated.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

FIG. 1 illustrates an exemplary layout of a node, having an energy storage cell and control circuit, of a multi-cell energy storage pack, according to one embodiment. An exemplary node 100 includes a control circuit 102 and an energy storage cell 104 (indicated by the electrical symbol for a battery for convenience). The node 100 serves as an "intelligent" voltage and current source of a multi-cell energy storage pack, according to one embodiment.

An exemplary control circuit 102 includes a bidirectional DC-DC converter 106, examples of which are described below. The control circuit 102 also includes a sensing system 108, a temperature sensor 110, a processing system 112, and a drive system 114. The sensing system 108 monitors cell temperature, cell current and voltage characteristics, and node voltage characteristics over time, and provides that information to the processing system 112. The processing system 112 processes the information from the sensing system based on stored information regarding how to control the DC-DC converter depending on the monitored conditions, and then outputs information to the drive system 114 for appropriately controlling the converter 106 to achieve enhanced performance of the cell 104.

Pins A and B of sensing system 108 are connected to a current sensor included in the DC-DC converter 106. Pins C and D of the sensing system 108 are connected to a temperature sensor 110 (e.g., mounted on the cell 104). The cell 104 is connected to pins 2 and 3 of the system node 100 to electrical connections at converter 106. Pin E of sensing system 108 is connected to pin 2 (Bus+) of the system node 100, and pin F of the sensing system 108 is connected to pin 3 (Bus−) of the system node 100. Pin G of the sensing system 108 is connected to pin 2 (Bat+) of the system node 100.

The processing system 112 includes input connections that receive signals from the sensing system 108, as well as a communications bus connection to pin 5 of the system node 100. The processing system 112 also includes an output connection to the drive system 114. The drive system 114 includes an input connection from the processing system 112 and output connections to the DC-DC converter 106.

Figure 2:
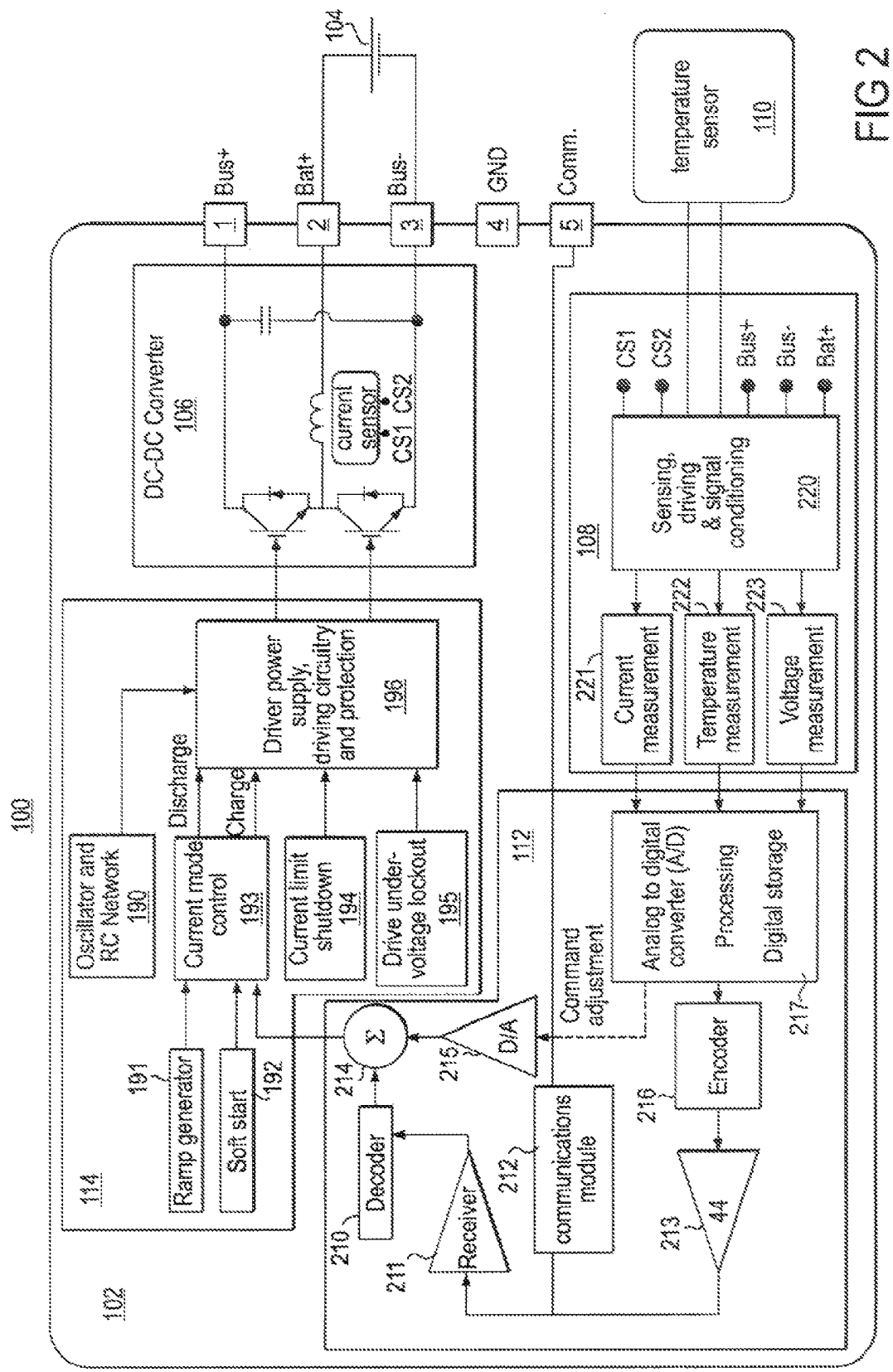
FIG. 2 illustrates an exemplary control circuit of a multi-cell energy storage pack, according to one embodiment.

FIG. 2 illustrates a detailed exemplary control circuit of a multi-cell energy storage pack, according to one embodiment. A node 100 includes a control circuit 102 and a cell 104. The control circuit 102 includes a DC-DC converter 106, a sensing and measurement system 108, a temperature sensor 110, a processing and communications system 112, and a drive signal generation and protection system 114.

The exemplary sensing and communications system 108 includes a sensing, driving, and signal conditioning module 220 with electrical connections to the outputs CS1 and CS2 of the current sensor 160, to temperature sensor 110, to pin 1 (Bus+), to pin 2 (Bat+), and to pin 3 (Bus−). The sensing, driving, and signal conditioning module 220 prepares and conditions the current, temperature, and voltage input signals to be measured over time at current measurement module 221, temperature measurement module 222, and voltage measurement module 223. The sensing and measurement system 108 transmits the measured values to the processing and communications system 112.

Processing and communications system 112 includes a module 217 that contains an analog-to-digital converter, a processing system, and digital storage. The analog-to-digital converter converts the analog measurements of current, temperature, and voltage from sensing system 108 into corresponding digital values. The processing system stores and correlates the current, temperature, and voltage data with instructions contained within a system memory, and processes charge/discharge algorithms to generate instructions to be sent to drive signal generation and protection system 114 via a digital-to-analog converter 215 and a command signal summation module 214. Module 217 also sends data to transmitter 213 via encoder module 216. Transmitter 213 sends data to two-wire communications module 212, which sends data to and receives data and instructions from a supervisory controller. The two-wire communications module 212 sends incoming data and instructions to a receiver module 211 that prepares the data and instructions to be sent to a decoder module 210. Decoder module 210 interprets received data and can send information to the processing module 217 and to drive system 114 via a command signal summation module 214.

Drive system 114 includes a current mode control module 193 with input signals from processing system 112, a soft start module 192 that provides control signals during system startup, and a ramp generator module 191 that generates a baseline drive signal during normal operation. The current mode control module 193 processes the input signals and sends control signals to the driver power supply, driving circuitry and protection module 196 for both charge and discharge operations.

Drive system 114 also includes a current limit shutdown module 194 that sends control signals to the driver power supply, driving circuitry and protection module 196 to govern system operation when system current levels exceed the safe operating range of components in DC-DC converter 106 or cell 104.

Drive system 114 also includes a drive under-voltage lockout module 195 that sends control signals to the driver power supply, driving circuitry and protection module 196 to govern system operation when voltage levels in DC-DC converter 106 or cell 104 fall below levels necessary for safe and efficient operation.

Drive system 114 also includes an oscillator and resistor-capacitor (RC) network module 190 that provides a clock signal to the driver power supply, driving circuitry and protection module 196. The driver power supply, driving circuitry and protection module 196 in drive system 114 provides control signals to the switching devices in DC-DC converter 106.

Exemplary processing of charge and discharge algorithms involves, for example, accessing look-up tables previously populated with cell operation information and decision making based upon the looked-up information. Exemplary decision-making algorithms are based upon, for example, trial-and-error testing of cell operation under different charging and discharging conditions as a function of time over the lifetime cycles of test cells. In other words, under controlled conditions of trial-and-error testing, the impact on cell operation of changing voltage and/or current characteristics of that type of cell, depending upon its existing state, is tabulated. Algorithms are then coded to change the voltage and/or current characteristics of such a cell (via converter 106) to achieve the performance desired. For example, if it is determined by the processing system 112 that the present discharge rate of a particular cell 104 (assessed via measurements from sensing system 108) suggests that the cell's lifetime will be two months too short, an algorithm looks up in a look-up table the appropriate correction to be applied to the converter 106 of that cell 104 based upon the calculated lifetime shortfall and the present current and voltage operating characteristics of the cell 104.

According to one embodiment, the processing of processing system 112 is carried out by one or more central processors executing sequences of software processing instructions and by suitably communicating with one or more memory or storage devices in any suitable database (e.g., local or remote database). Processing instructions, and look-up tables, are accessed from any suitable computer-readable storage medium, such as a memory card, flash memory, magnetic or optical disc, CD or DVD, or any other memory chip or cartridge. In alternative embodiments, hard-wired circuitry is used in place of or in combination with software instructions to implement the exemplary methods described herein. Thus, the present embodiments are not limited to any specific combination of hardware circuitry and software. It should be appreciated that the processing disclosed herein can be carried out using any suitable processing system, such as one or more conventional processors located in one computer system or in multiple computer systems acting together by any suitable communication link.

Figure 3:
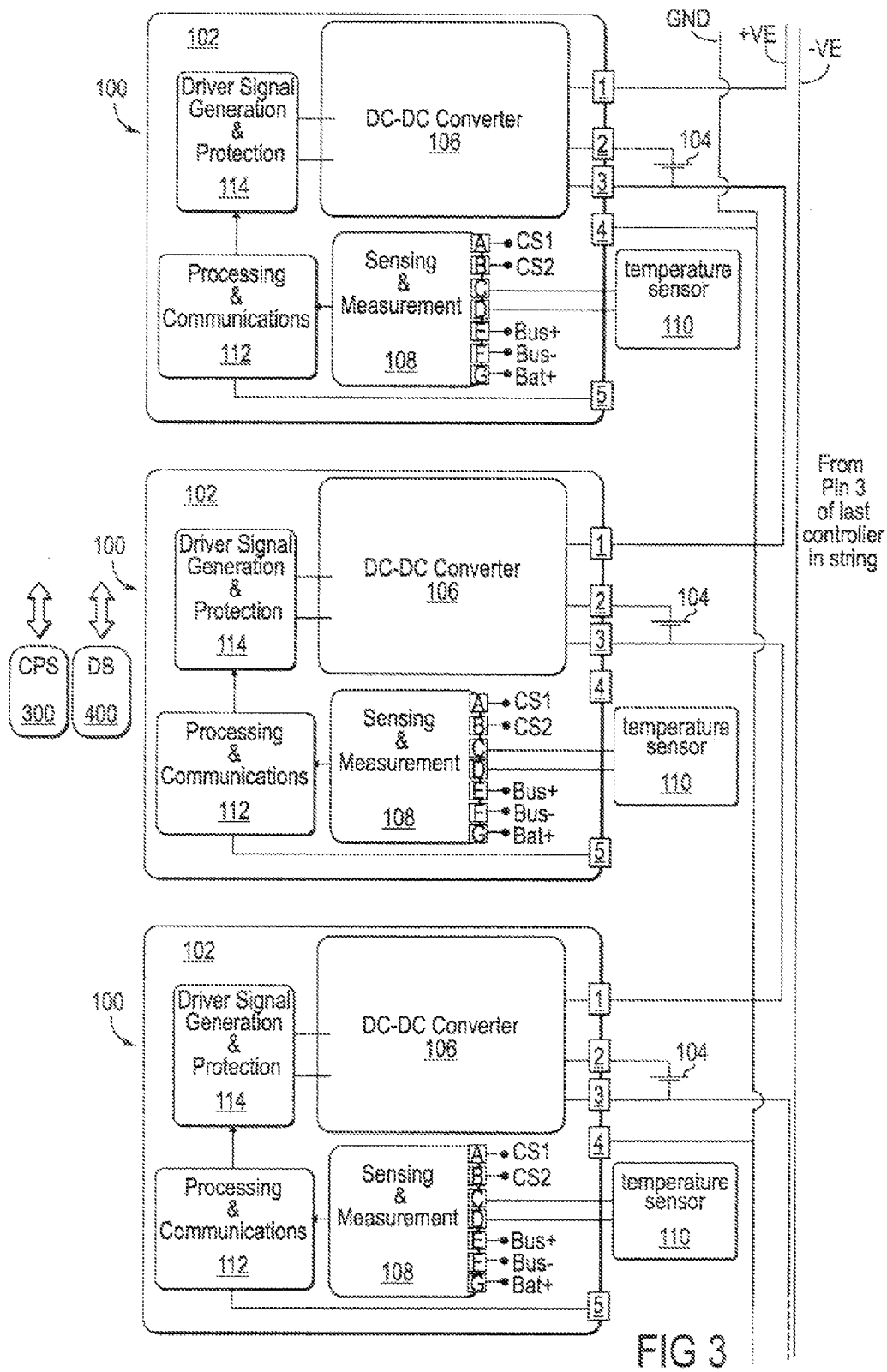
FIG. 3 illustrates a series string of multiple nodes in a multi-cell energy storage pack, according to one embodiment.

FIG. 3 illustrates a series string of multiple nodes and control circuits of a multi-cell energy storage pack, according to one embodiment. An exemplary multi-cell energy storage pack includes a plurality of nodes 100, each node 100 including a control circuit 102 and a cell 104. Each cell 104 is electrically connected to a corresponding one of the multiple control circuits 102. In a series string connection, the plurality of control circuits 102 are connected in series such that a positive-voltage bus terminal of one control circuit 102 is connected to a negative-voltage bus terminal of a next control circuit 102. Such series configurations permit higher overall output voltages substantially equal to the sum of the individual output voltages generated by each individual node.

The processing system 112 of each of the multiple circuits 102 connected in series sends voltage, current, and temperature data to a central processing system 300 (CPS) and data repository 400 (DB). Each processing system 112 also receives periodic instructions from the CPS 300 to control the DC-DC converter 106 of each circuit to enhance the overall operation of the multi-cell storage pack depending upon the behavior of the other cells 104 of the storage pack. In this way, overall system performance is enhanced and controlled to achieve desired voltage and current output overall. Lifetimes of individual cells 104 are also controlled to homogenize the lifetimes of all of the cells of the package. Cells 104 are prevented from reaching the end of their useable life significantly sooner than others. Individual cells 104 are controlled to maximize the cell's lifetime energy contribution to the energy storage pack.

Figure 4A:
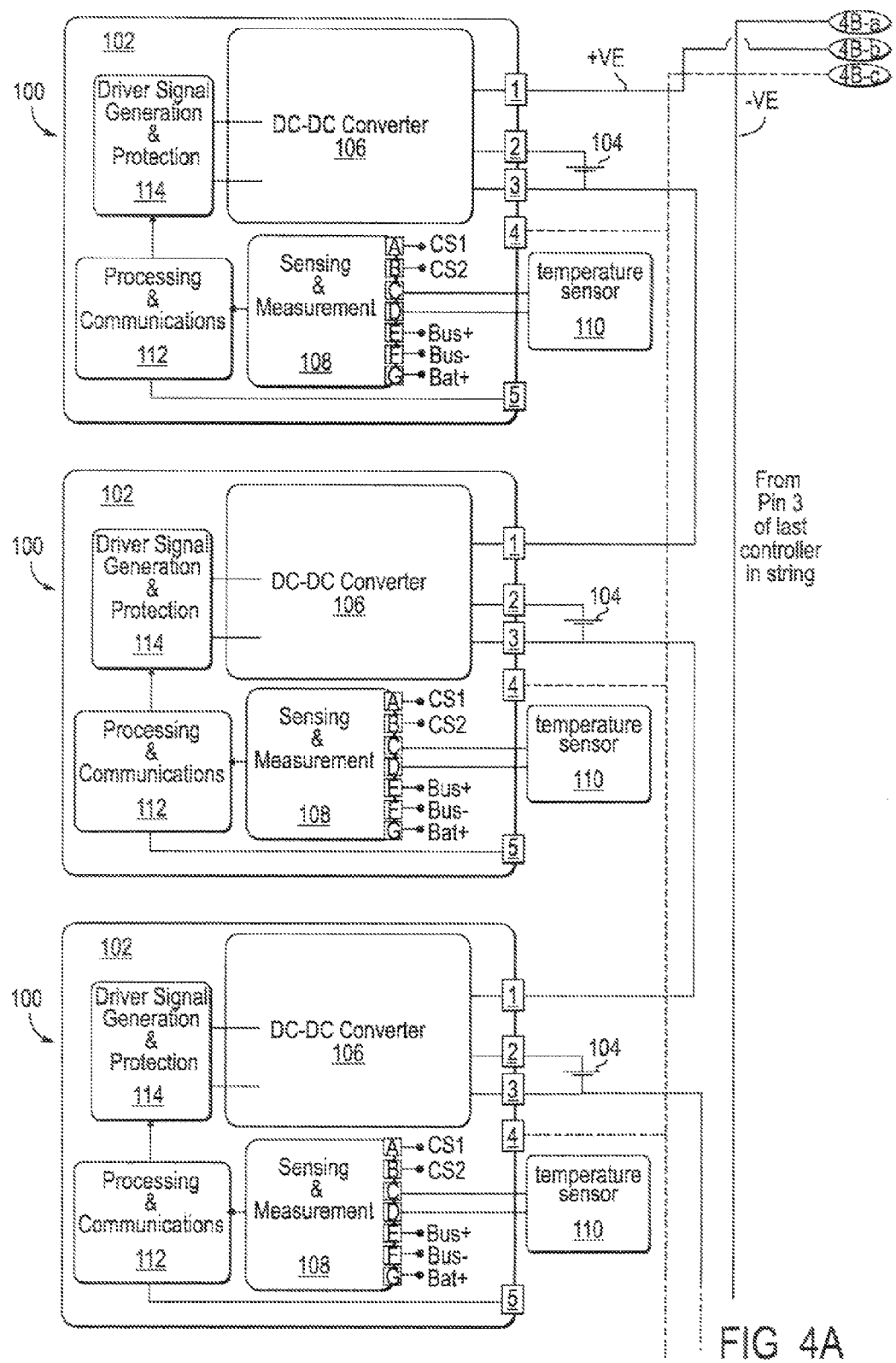
FIG. 4 illustrates a parallel arrangement of multiple nodes in a multi-cell energy storage pack, according to one embodiment.
Figure 4B:
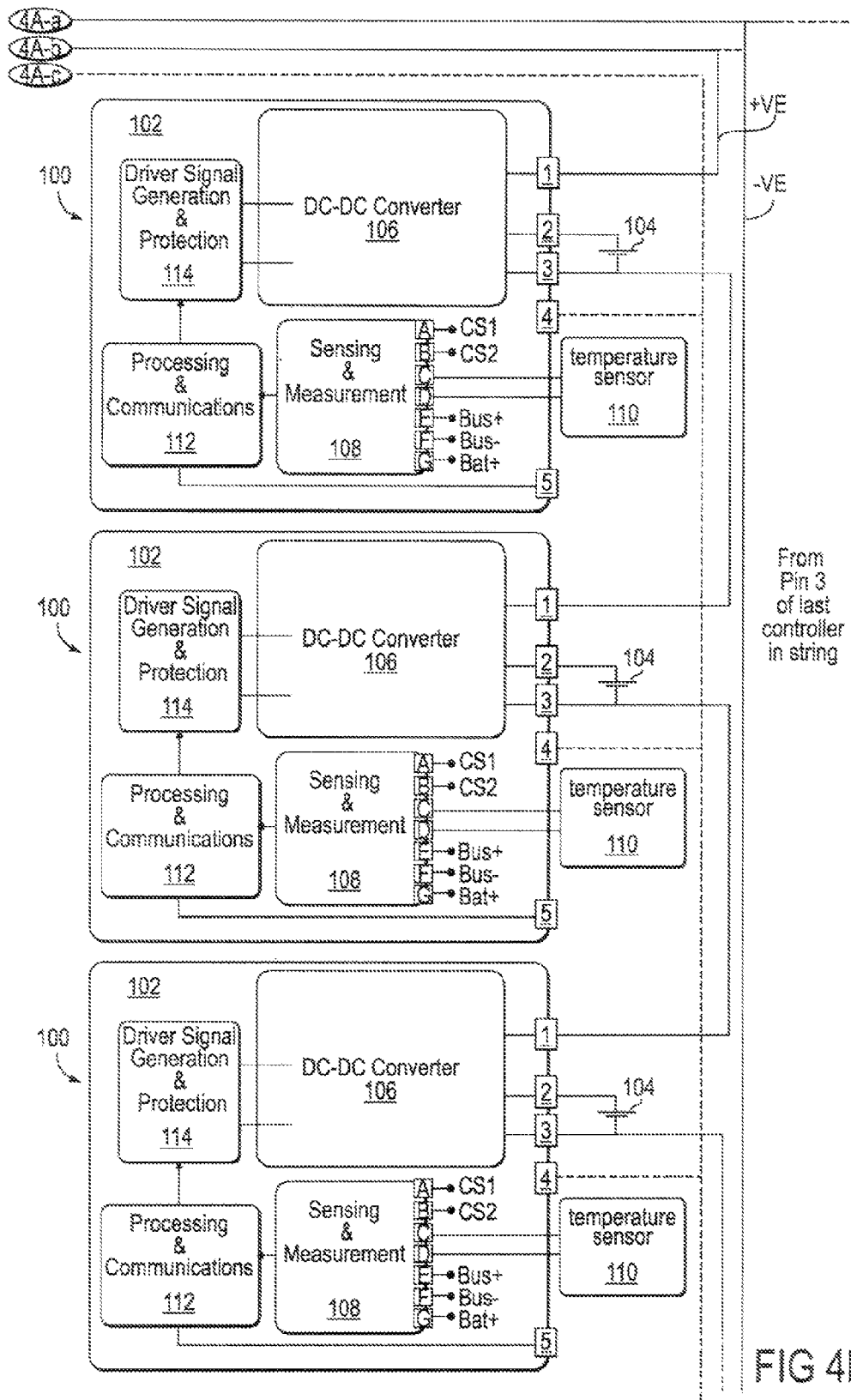

FIG. 4 illustrates a parallel arrangement of multiple nodes 100 and control circuits 102 of a multi-cell 104 energy storage pack, according to one embodiment. A parallel configuration permits higher current capacity at an output voltage substantially equal to the output voltage generated by each individual node.

Appropriate substitution of inductors for capacitors (and vice versa), currents for voltages, and series for parallel configurations while still achieving the desired functionality, are considered to be within the scope of the present disclosure in light of the teachings presented herein.

According to one embodiment, a plurality of nodes is configured in series strings of arbitrary length functioning in parallel with other series strings that are of the same or differing lengths.

According to one embodiment, a plurality of nodes are used in energy storage systems employing heterogeneous collections of individual energy storage devices. For example, a collection of series strings operating in parallel consists of nodes connected to any combination of electro-chemical battery cells, super-capacitors, flywheels, or any other energy storage devices. The present system and method optimize cell performance irrespective of cell technology, chemistry, and/or relative performance capabilities.

Figure 5:
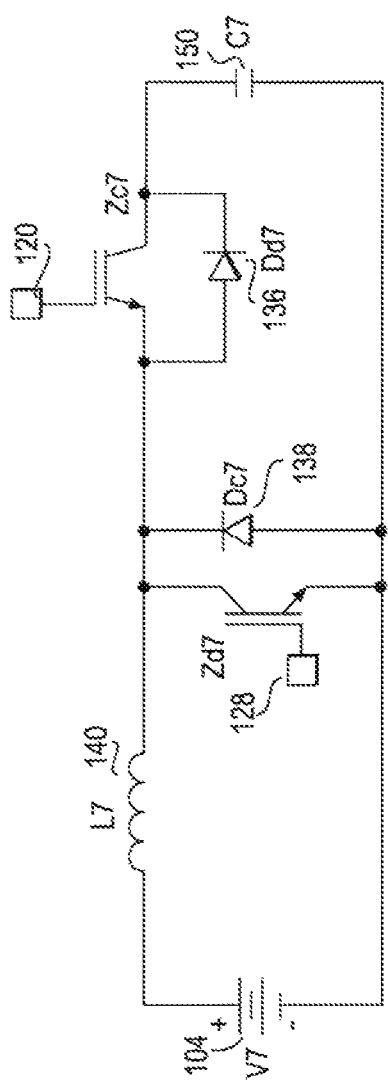
FIG. 5 illustrates a circuit diagram of an exemplary bi-directional DC-DC converter for use in a multi-cell energy storage pack, according to one embodiment.

FIG. 5 illustrates a circuit diagram of an exemplary bi-directional DC-DC converter for use in a multi-cell energy storage pack, according to one embodiment.

An exemplary DC-DC converter serves as a voltage step-up (boost) and voltage step-down (buck) converter for discharging and charging functions respectively of the cell 104. The converter circuit 106 can adjust its bus contribution voltage (BCV), defined as the voltage across capacitor C7 150, by varying the duty cycle of switch Zd7 128 during a discharge cycle and switch Zc7 120 during a charge cycle. Energy from the cell 104 is delivered to the output capacitor C7 150 during a discharge cycle and vice versa during a charging cycle. According to this embodiment, the energy transfer and storage medium is the inductor L7 140.

Diodes Dc7 138 and Dd7 136 provide a path for the inductor L7 140 current when the switches Zc7 120 and Zd7 128 are off during switch-mode pulse-width modulation (PWM) operation. Charging and discharging current are regulated based on the optimal charge and discharge profile of the cell with the aid of sensing, processing and drive systems.

During a discharging mode the switch Zd7 128 is turned ON and energy is extracted out of the cell as the current through the inductor L7 140 increases. Upon attaining a predetermined current magnitude in the inductor L7 140 the switch Zd7 128 is turned OFF. The current flowing through the inductor L7 140 now establishes a new path that allows it to flow through diode Dd7 136 and into the output capacitor C7 150.

During charging mode the switch Zc7 120 is turned ON and energy is extracted out of the capacitor C7 150 and is inserted into the cell(s) via the inductor L7 140. Upon attaining a predetermined current magnitude in the inductor the switch Zc7 120 is turned OFF, and the inductor current now establishes a new path that allows it to flow through the diode Dc7 138.

The exemplary node thus possesses the functionality and ability to transform an input voltage from the cell to a desired output voltage and/or to transform an input current from the cell to a desired output current.

Figure 6:
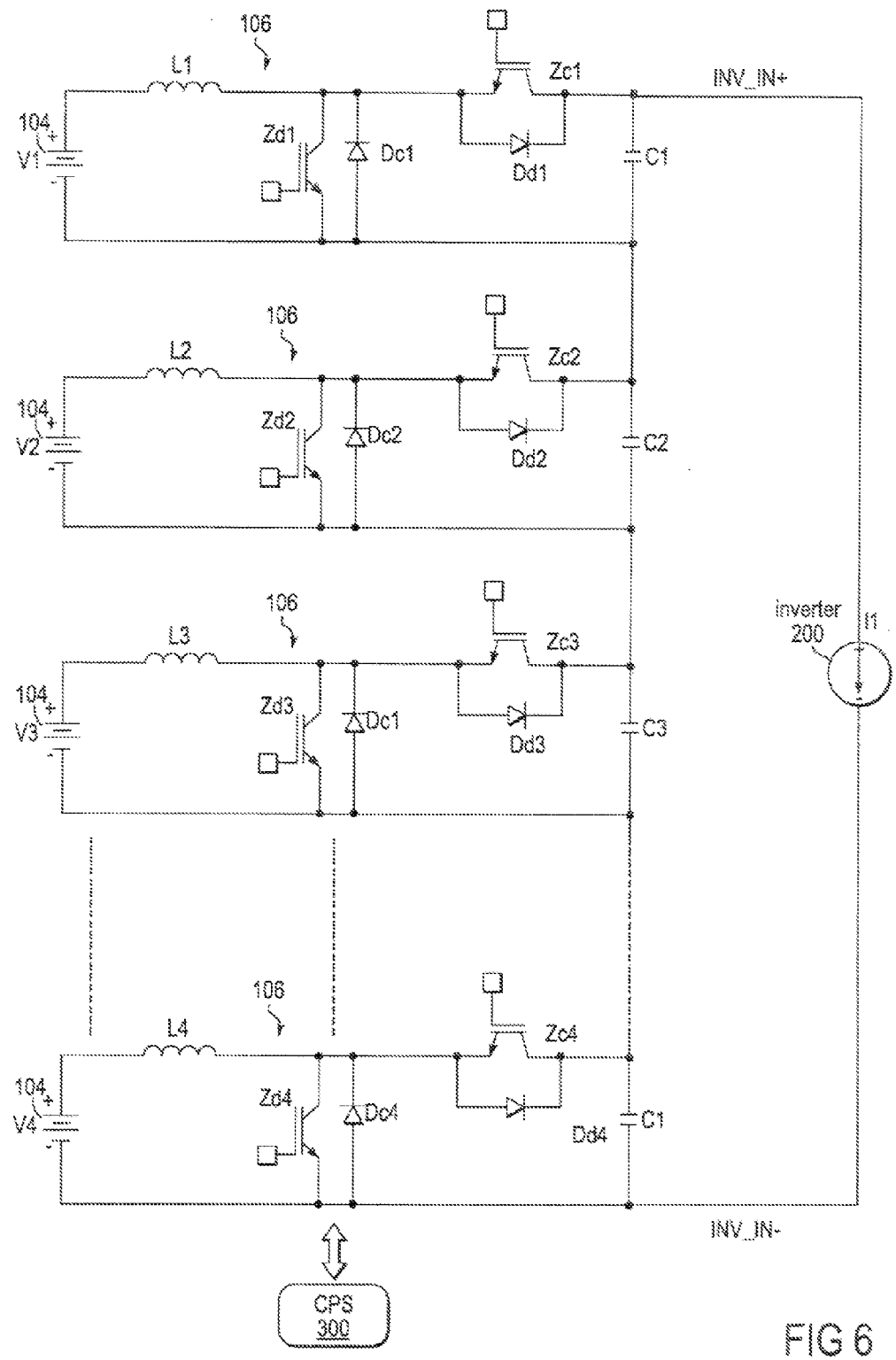
FIG. 6 illustrates a series string of multiple DC-DC converters and cells in a multi-cell energy storage pack, according to one embodiment.

FIG. 6 illustrates a series string of multiple DC-DC converters and cells in a multi-cell energy storage pack, according to one embodiment. In a series string, the outputs of the DC-DC converters 106 are electrically connected in series to the input of a power conversion device such as an inverter for driving an electrical motor or inter-connecting to the utility grid. Each node is capable of estimating the present state of charge of the cell 104 based on measured current, voltage, temperature and its own historical performance data, which is regularly (e.g. periodically, continually) updated and stored in memory. According to one embodiment, each node is programmed to achieve an optimal number of lifetime cycles of operation for given cell chemistry and characteristics. For example, each node is operated so that each cell follows as closely as possible a target slope (i.e. desired behavior) of capacity fade versus number of cycles for a given load. The target slope can be based upon performance testing of actual cells or simulated predictions, such as depicted by the exemplary line 300 in FIG. 7.

Referring again to FIG. 6, based on the load requirements, the external inverter 200 sets a current demand on the string, and the individual nodes adjust their bus contribution voltages (BCV). The BCVs are adjusted based on the capacity of each cell 104 and their target BCVs commanded by a central processing system 300 (CPS), which can be located at the end of the string or inside the inverter. The central processing system 300 maintains a constant bus voltage for most operating conditions of the inverter.

The current flowing through a cell depends upon the load placed on the series string in aggregate and the load placed on the individual cell. The CPS 300 manages the current flowing through an individual cell by controlling the BCV. Thus, current flow through an individual cell is managed independently of current flowing through the string. Current flow through the cell is based on the cell's instantaneous power handling capability, as assessed by the CPS 300 and correlated to the BCV of that node.

Figure 7:
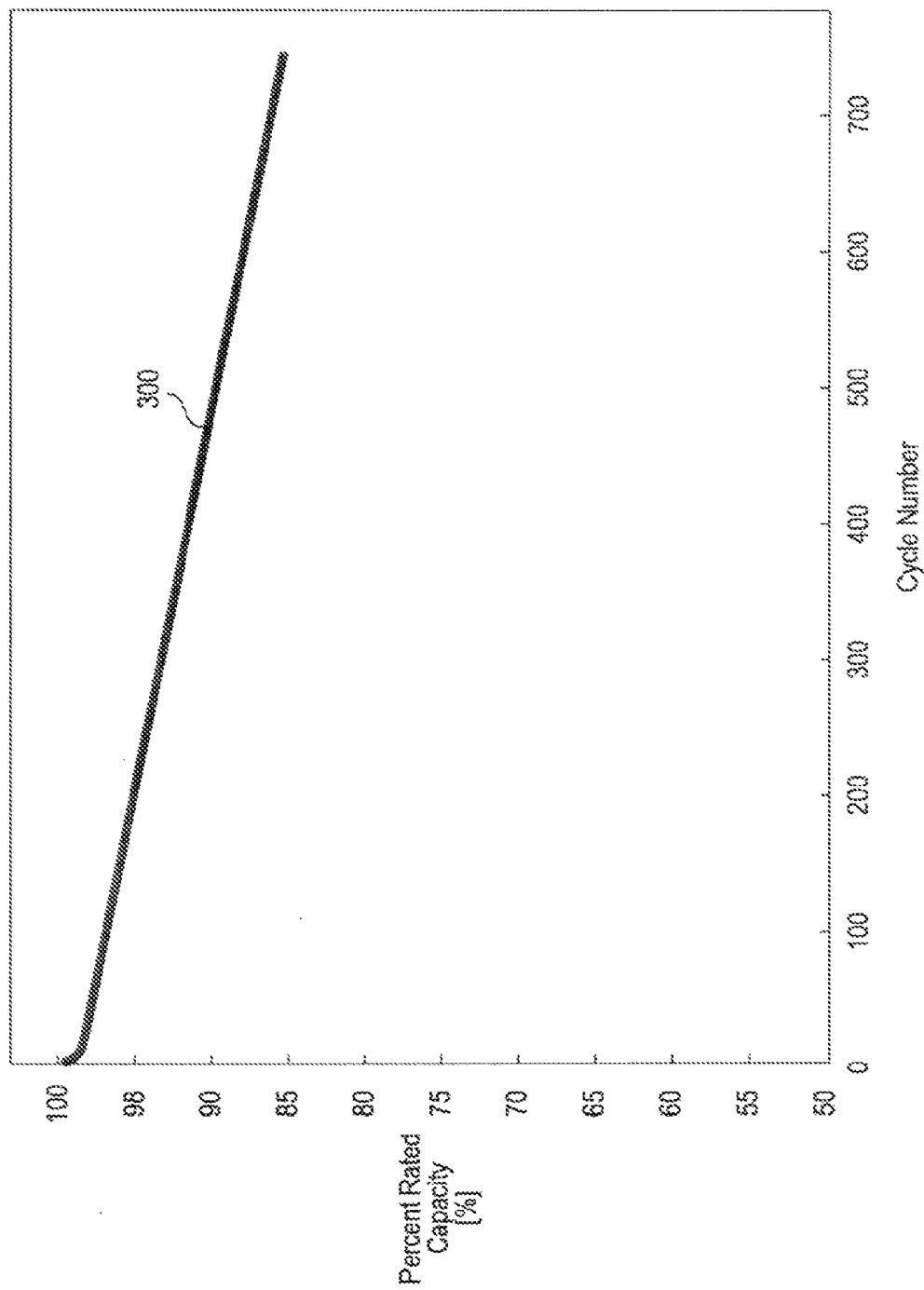
FIG. 7 illustrates a target capacity fade versus cycle number performance function of an energy storage cell within a multi-cell energy storage pack, according to one embodiment.

The CPS 300 determines BCV for each node based on reported cell capacities and their performance with respect to the target slope of FIG. 7. The summation of the target BCVs equals the desired bus voltage target. The rate at which the BCV targets are updated is based on cell degradation estimates and performance characteristics, such as using predefined look-up tables.

In a typical discharge cycle, if the load increases, the inverter 200 starts to draw more current, I1, on the inverter bus, to meet the increased power requirements. To meet the increased current demand on the string, the processing system adjusts the boost switch duty cycle to meet the new current demand and maintain the node's BCV, as was determined by the CPS 300. A re-adjustment (lowering) of the boost switch duty cycle occurs when the load on the inverter decreases.

In a typical charge cycle, if the regenerative power of the load increases, the inverter 200 starts to deliver more current, I1, onto the inverter bus, to meet the increased regenerative power being produced. To meet the increased current regeneration on the string, the processing system adjusts the buck switch duty cycle to meet the new current being delivered and maintain the node's BCV, as was determined by the CPS 300. A re-adjustment (lower) of the buck switch duty cycle occurs when the regenerated power delivered by the inverter decreases.

In the event that a cell is not capable of contributing useful energy to the series string, whereby the BCV is below the forward bias voltage of diodes Dc7 138 and Dd7 136 of FIG. 5, then the circuit can bypass the cell, such that the series string continues to function with the energy contributions of the remainder of cells in the string. In such a condition, the CPS 300 re-adjusts the BCVs of the remaining nodes to reach the target bus voltage of the string.

The CPS 300 assesses cell voltage, current, and temperature to detect precursor stages of an unsafe operating regime, such as thermal runaway. In this event, a node can mitigate the potentially harmful conditions by preventing any further charging or discharging of the cell, or permitting discharge of the cell through the inductor, depending on the CPS 300 and the node controller's assessment of appropriate actions.

FIG. 7 illustrates a target capacity fade versus cycle number performance function of an energy storage cell within a multi-cell energy storage pack, according to one embodiment. A line 300 indicates a target slope of capacity versus cycle number. As previously discussed, the target slope can be based upon performance testing of actual cells, simulations, or other predictive methods.

Figure 8:
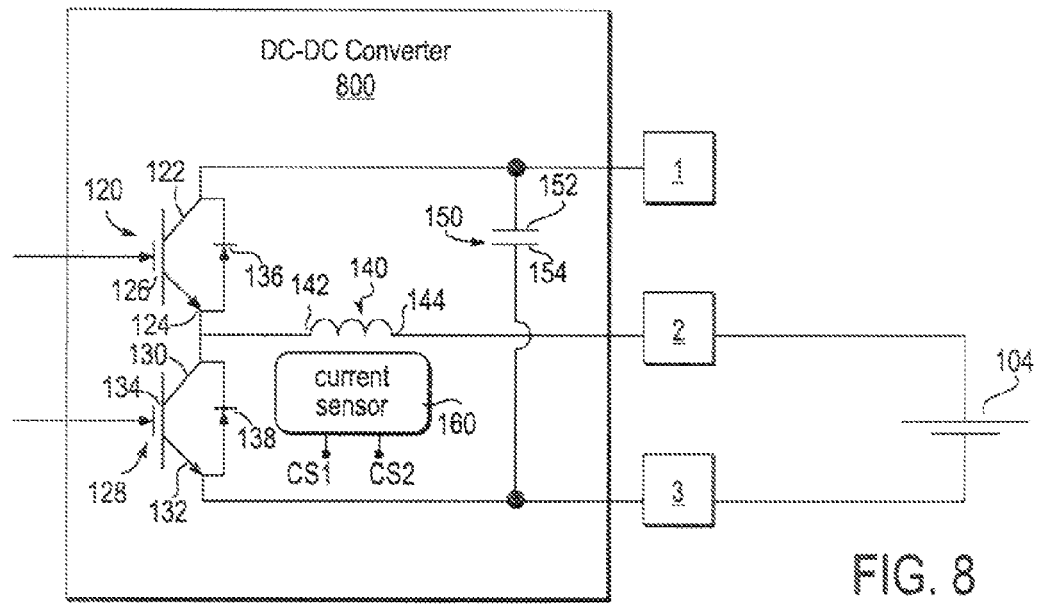
FIG. 8 illustrates an exemplary DC-DC converter for use within a multi-cell energy storage pack, according to one embodiment.

FIG. 8 illustrates an exemplary DC-DC converter for use within a multi-cell energy storage pack, according to one embodiment. An exemplary DC-DC converter 800 includes a first switch 120 having a first terminal 122, a second terminal 124, and a control terminal 126 that controls an electrical connection between the first and second terminals. The converter 800 also includes a second switch 128 having a first terminal 130, a second terminal 132, and a control terminal 134 that controls an electrical connection between the first and second terminals. A diode 136 is connected to terminals 122 and 124 so as to pass current from second terminal 124 to first terminal 122, and a diode 138 is connected to terminals 130 and 132 so as to pass current from second terminal 132 to first terminal 130. Switches 120 and 128 can be, for example, MOS Field Effect Transistors (MOSFETs), Insulated Gate Bipolar Transistors (IGBTs), Bipolar Junction Transistors (BJTs) or MOS-Controlled Thyristor (MCTs). According to one embodiment, diodes 136 and 138 can be, for example, the body diodes included in many power MOSFETs, or can be separate components, such as Schottky diodes.

The converter 800 also has an inductor 140 having a first terminal 142 and a second terminal 144. The first terminal 142 of the inductor 140 is electrically connected to both the second terminal 124 of the first switch 120 and the first terminal 130 of the second switch 128. The second terminal 144 of the inductor 140 is connectable to a positive cell terminal 2 of cell 104. Suitable inductance for the inductor will depend upon the particular application, voltages in the circuit and switch modulation frequency as implemented in the DC-DC converter controller. According to one embodiment, for nominal modulation frequencies in the range of 250 to 500 kHz, an inductance ranging from 100 nH to 300 nH is advantageous.

The converter 800 also includes a capacitor 150 having a first terminal 152 and a second terminal 154. The first terminal 152 of the capacitor 150 is electrically connected to both the first terminal 122 of the first switch 120 and a positive-voltage bus terminal 1 of a control circuit. The second terminal 154 of the capacitor 150 is electrically connected both to the second terminal 132 of the second switch 128 and a negative-voltage bus terminal 3 of the control circuit. The negative-voltage bus terminal 3 is connectable to a negative terminal of the cell 104. According to one embodiment, for nominal modulation frequencies in the range of 250 to 500 kHz, a capacitance ranging from 5 uF to 10 uF is advantageous.

The converter 800 also includes a current sensor 160 for measuring current through the inductor 140 to the cell 104. The current sensor 160 can be any suitable sensor such as a Hall-effect sensor, and is placed proximate to the inductor 140. The current sensor can also be any circuitry suitably inserted into the converter circuit 106, for example a shunt resistor in series with the inductor 140 or any suitable current sensing circuitry.

Values for inductance, capacitance, and switching can be selected depending upon the particular application and performance requirements at hand.

Figure 9:
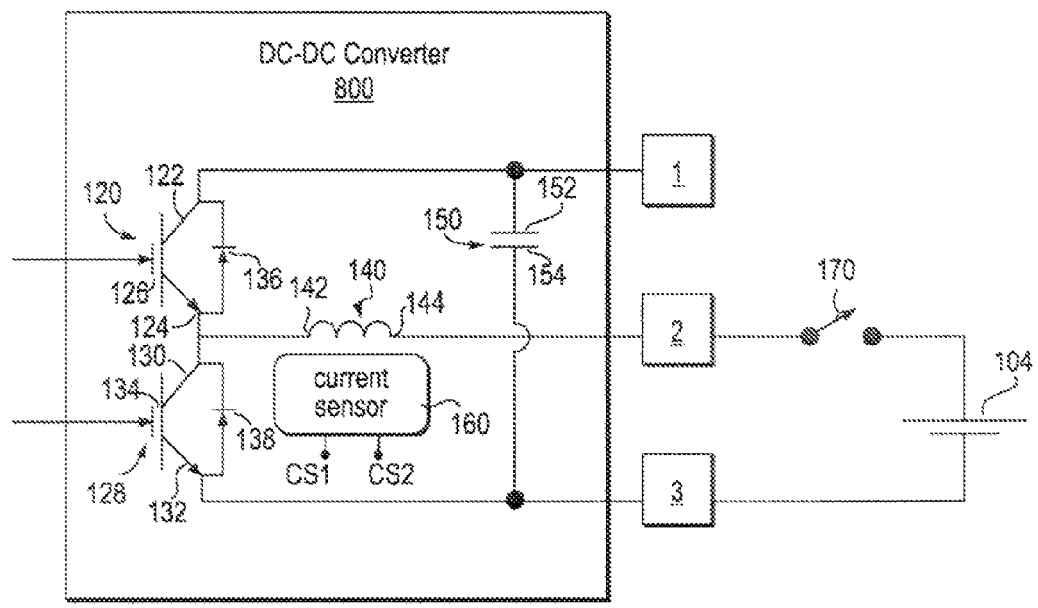
FIG. 9 illustrates an exemplary DC-DC converter for use within a multi-cell energy storage pack, according to one embodiment.

FIG. 9 illustrates an exemplary DC-DC converter for use within a multi-cell energy storage pack, according to one embodiment. The exemplary circuit 900 in FIG. 9 is similar to the circuit illustrated in FIG. 8, with the addition of switch 170. Switch 170 can be, for example, an electromechanical relay, a MOS Field Effect Transistor (MOSFET), an Insulated Gate Bipolar Transistors (IGBT), a Bipolar Junction Transistors (BJT), a or MOS-Controlled Thyristor (MCT). In the event that a cell 104 exhibits unsafe or anomalous behavior (for example, excessive heat buildup), the DC-DC converter circuit 900 can act to bypass the cell 104, such that the series string can continue to function without the energy contribution of the bypassed cell. Switch 170 enables the bypassed cell 104 to be disconnected from the electrical circuit, such that the cell 104 is not discharged through the DC-DC converter 900. This added capability is advantageous in ensuring safe, optimal operation of the cell. In such an operating condition, a CPS will re-adjust the BCVs of the remaining nodes to reach the target bus voltage of the string.

Figure 10:
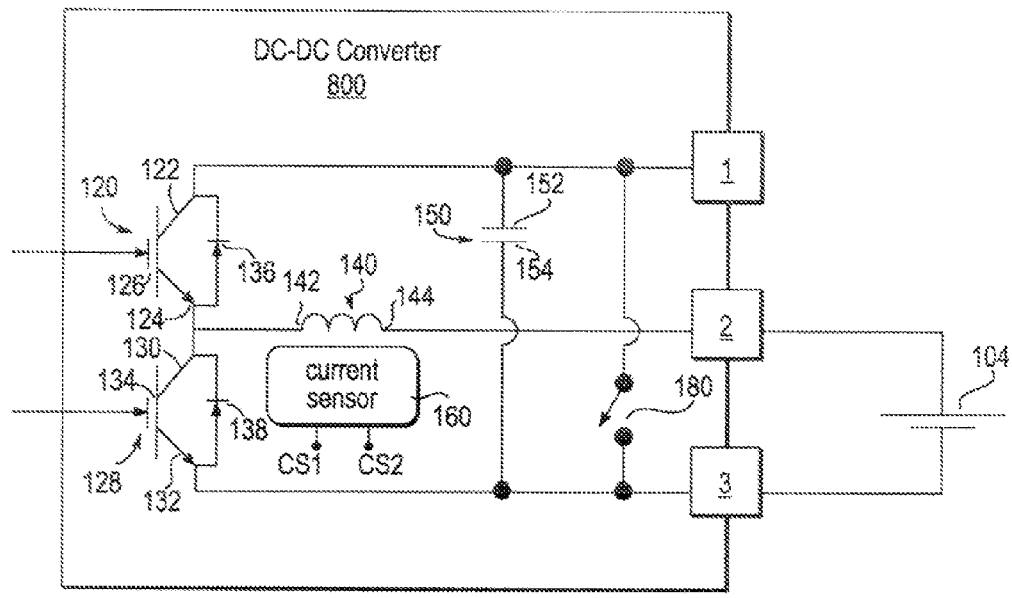
FIG. 10 illustrates an exemplary DC-DC converter for use within a multi-cell energy storage pack, according to one embodiment.

FIG. 10 illustrates an exemplary DC-DC converter for use within a multi-cell energy storage pack, according to one embodiment. The exemplary circuit 1000 in FIG. 10 is similar to the circuit illustrated in FIG. 8, with the addition of switch 180. Switch 180 can be, for example, an electromechanical relay, a MOS Field Effect Transistor (MOSFET), an Insulated Gate Bipolar Transistors (IGBT), a Bipolar Junction Transistors (BJT), a or MOS-Controlled Thyristor (MCT). In the event that a cell 104 exhibits unsafe or anomalous behavior (for example, excessive heat buildup), switches 120 and 128 are opened to disconnect the cell 104 from the circuit 1000, while switch 180 is engaged to bypass the cell 104 such that the series string can continue to function without the energy contribution of the bypassed cell 104. This added capability is advantageous in ensuring safe, optimal operation of the cell. In such an operating condition, a CPS will re-adjust the BCVs of the remaining nodes to reach the target bus voltage of the string. Switch 180 also enables the node to be electrically bypassed in the event that any of the components in the DC-DC converter circuit 1000 fail.

Figure 11:
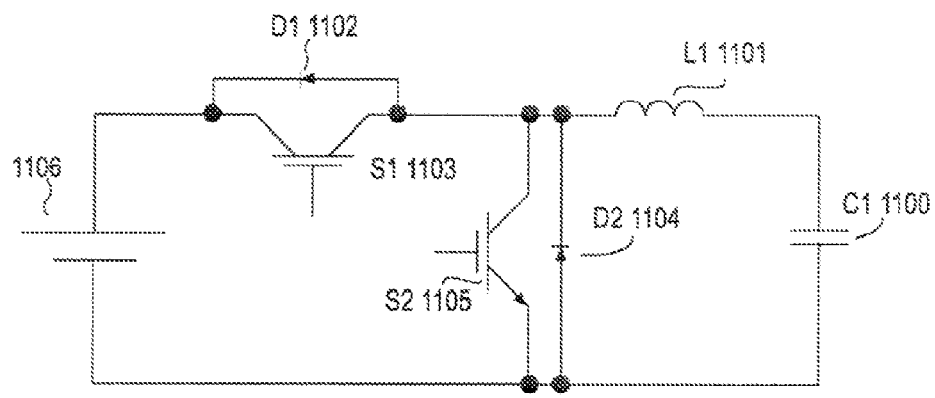
FIG. 11 illustrates a circuit diagram of an exemplary bi-directional DC-DC converter for use in a multi-cell energy storage pack, according to one embodiment.

FIG. 11 illustrates a circuit diagram of an exemplary bi-directional DC-DC converter for use in a multi-cell energy storage pack, according to one embodiment. The DC-DC converter in FIG. 11 serves as a voltage step-down (buck) converter for discharging and as a voltage step-up (boost) converter during charging of the cell 1106.

The converter circuit can adjust its bus contribution voltage (BCV), defined as the voltage across capacitor C1 1100, by varying the duty cycle of switch S1 1103 during a discharge cycle and switch S2 1105 during a charge cycle. Energy from the cell 1106 is delivered to the output capacitor C1 1100 during a discharge cycle and vice versa during a charging cycle. According to this embodiment, the energy transfer and storage medium is the inductor L1 1101.

Diodes D1 1102 and D2 1104 provide a path for the inductor L1 1101 current when the switches S1 1103 and S2 1105 are off during switch-mode pulse-width modulation (PWM) operation. Charging and discharging current are regulated based on the optimal charge and discharge profile of the cell with the aid of sensing, processing and drive systems.

During a discharging mode, the switch S1 1103 is turned ON and energy is extracted out of cell 1106 as the current through inductor L1 1101 increases. Upon attaining a predetermined current magnitude in inductor L1 1101, the switch S1 1103 is turned OFF. The current flowing through inductor L1 1101 now establishes a new path that allows it to flow through diode D2 1104 and into the output capacitor C1 1100.

During a charging mode, the switch S2 1105 is turned ON and energy is extracted out of the capacitor C1 1100, in addition to the current already established in the series string, thereby causing the current in inductor L1 1101 to increase. Upon attaining a predetermined current magnitude in inductor L1 1101, the switch S2 1105 is turned OFF, and the current in the inductor L1 1101 now establishes a new path that allows it to flow through diode D1 1102 and cell 1106.

The exemplary node thus possesses the functionality and ability to transform an input voltage from the cell to a desired output voltage and/or to transform an input current from the cell to a desired output current.

It will be appreciated by those skilled in the art that variations can be made to the exemplary DC-DC converter, without departing from the spirit and scope of the present disclosure. For example, based on principles of duality of electrical circuits, variations of the exemplary DC-DC converter can be made by appropriate substitution of inductors for capacitors (and vice versa), currents for voltages, and series for parallel configurations while still achieving the desired functionality, and such variations are considered to be within the scope of the present disclosure in light of the teachings presented herein.

A system and method for scalable configuration of intelligent energy storage packs have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A method, comprising:
providing independent current measurements of a plurality of energy storage cells electrically connected to a plurality of respective converter circuits from a plurality of respective control circuits, wherein the respective converter circuits transform respective input voltages from the plurality of respective energy storage cells to respective desired output bus contribution voltages, wherein a summation of the respective desired output bus contribution voltages equals a total desired bus voltage, and wherein the plurality of energy storage cells are part of a multi-cell storage pack;

providing independent voltage measurements of the plurality of energy storage cells; and receiving first control signals for a first energy storage cell of the plurality of energy storage cells, wherein the first control signals are determined according to a load policy, wherein the load policy is based on estimation of cell lifetime of the first energy storage cell relative to estimation of cell lifetimes of other energy storage cells of the plurality of energy storage cells, and wherein a first converter circuit from a first control circuit transforms a first input voltage from the first energy storage cell to a desired first output bus contribution voltage according to the first control signals.

2. The method of claim 1, further comprising providing a first temperature measurement of the first energy storage cell.

3. The method of claim 1, wherein the load policy is defined using at least one of historical energy storage cell characteristics, energy storage cell degradation characteristics, energy storage cell performance characteristics, and desired energy storage cell charge and discharge operation.

4. The method of claim 1, further comprising:
receiving second control signals for a second energy storage cell of the plurality of energy storage cells, wherein the second control signals are determined according to the load policy, and wherein a second converter circuit from a second control circuit transforms a second input voltage from the second energy storage cell to a desired second output bus contribution voltage according to the second control signals.

5. The method of claim 4, further comprising providing a second temperature measurement of the second energy storage cell.

6. The method of claim 4, wherein the first control circuit and the second control circuit are electrically connected together in the multi-cell storage pack, and wherein the first control circuit and the second control circuit are electrically connected together in one of a series configuration or a parallel configuration, and wherein the first output bus contribution voltage and the second output bus contribution voltage are coordinated to provide the total desired bus voltage from the multi-cell storage pack.

7. The method of claim 1, wherein the first converter circuit is one of a boost-buck converter or a buck-boost converter.

8. An apparatus, comprising:
a plurality of energy storage cells from a multi-cell storage pack; and
a plurality of control circuits electrically connected to the plurality of respective energy storage cells, the plurality of control circuits having a plurality of respective converter circuits, wherein the plurality of control circuits
provides independent current measurements of the plurality of respective energy storage cells electrically connected to the plurality of respective converter circuits, wherein the plurality of respective converter circuits transform respective input voltages from the plurality of respective energy storage cells to respective desired output bus contribution voltages, and wherein a summation of the respective desired output bus contribution voltages equals a total desired bus voltage; and
provides independent voltage measurements of the plurality of respective energy storage cells; and
wherein a first control circuit of the plurality of control circuits receives first control signals for a first energy storage cell, wherein the first control signals are determined according to a load policy, wherein the load policy is based on estimation of cell lifetime of the first energy storage cell relative to estimation of cell lifetimes of other energy storage cells of the plurality of energy storage cells, and wherein a first converter circuit transforms a first input voltage from the first energy storage cell to a desired first output bus contribution voltage according to the first control signals.

9. The apparatus of claim 8, wherein the first control circuit further provides a first temperature measurement of the first energy storage cell.

10. The apparatus of claim 8, wherein the load policy is defined using at least one of historical energy storage cell characteristics, energy storage cell degradation characteristics, energy storage cell performance characteristics, and desired energy storage cell charge and discharge operation.

11. The apparatus of claim 8, further comprising:
a second control circuit of the plurality of control circuits receiving second control signals for a second energy storage cell, wherein the second control signals are determined according to the load policy, and wherein a second converter circuit transforms a second input voltage from the second energy storage cell to a desired second output bus contribution voltage according to the second control signals.

12. The apparatus of claim 11, wherein the second control circuit further provides a second temperature measurement of the second energy storage cell.

13. The apparatus of claim 11, wherein the first control circuit and the second control circuit are electrically connected together in the multi-cell storage pack, and wherein the first control circuit and the second control circuit are electrically connected together in one of a series configuration or a parallel configuration, and wherein the first output bus contribution voltage and the second output bus contribution voltage are coordinated to provide the total desired bus voltage from the multi-cell storage pack.

14. The apparatus of claim 8, wherein the first converter circuit is one of a boost-buck converter or a buck-boost converter.

15. A system, comprising:
a central processing system in communication with a database;
a plurality of control circuits in communication with the central processing system, the plurality of control circuits electrically connected to a plurality of respective energy storage cells, the plurality of control circuits having a plurality of respective converter circuits, wherein the plurality of control circuits provides independent current measurements of the plurality of respective energy storage cell electrically connected to the plurality of respective converter circuits, wherein the respective converter circuits transform respective input voltages from the plurality of respective energy storage cells to respective desired output bus contribution voltages, wherein a summation of the respective desired output bus contribution voltages equals a total desired bus voltage, and wherein the plurality of energy storage cells are part of a multi-cell storage pack; and
provides independent voltage measurements of the plurality of respective energy storage cells; and
wherein a first control circuit of the plurality of control circuits receives first control signals for a first energy storage cell, wherein the first control signals are determined according to a load policy, wherein the load policy is based on estimation of cell lifetime of the first energy storage cell relative to estimation of cell lifetimes of other energy storage cells of the plurality of energy storage cells, and wherein a first converter circuit transforms a first input voltage from the first energy storage cell to a desired first output bus contribution voltage according to the first control signals.

16. The system of claim 15, wherein the first control circuit further provides a first temperature measurement of the first energy storage cell.

17. The system of claim 15, wherein the load policy is defined using at least one of historical energy storage cell characteristics, energy storage cell degradation characteristics, energy storage cell performance characteristics, and desired energy storage cell charge and discharge operation.

18. The system of claim 15, further comprising:
a second control circuit of the plurality of control circuits receiving second control signals for a second energy storage cell of the plurality of energy storage cells, wherein the second control signals are determined according to the load policy, and wherein a second converter circuit transforms a second input voltage from the second energy storage cell to a desired second output bus contribution voltage according to the second control signals.

19. The system of claim 18, wherein the second control circuit further provides a second temperature measurement of the second energy storage cell.

20. The system of claim 18, wherein the first control circuit and the second control circuit are electrically connected together in the multi-cell storage pack, and wherein the first control circuit and the second control circuit are electrically connected together in one of a series configuration or a parallel configuration, and wherein the first output bus contribution voltage and the second output bus contribution voltage are coordinated to provide the total desired bus voltage from the multi-cell storage pack.

21. The method of claim 1, further comprising disconnecting the first energy storage cell from the multi-cell storage pack when the first energy storage cell is unable to achieve the desired first output bus contribution voltage.

22. The apparatus of claim 8, wherein the first control circuit disconnects the first energy storage cell from the multi-cell storage pack when the first energy storage cell is unable to achieve the desired first output bus contribution voltage.

23. The system of claim 15, wherein the first control circuit disconnects the first energy storage cell from the multi-cell storage pack when the first energy storage cell is unable to achieve the desired first output bus contribution voltage.

\* \* \* \* \*